United States Patent
Miura

(10) Patent No.: US 11,920,061 B2
(45) Date of Patent: Mar. 5, 2024

(54) ADHESIVE SHEET

(71) Applicant: DENKA COMPANY LIMITED, Tokyo (JP)

(72) Inventor: Manabu Miura, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 590 days.

(21) Appl. No.: 17/277,164

(22) PCT Filed: Sep. 25, 2019

(86) PCT No.: PCT/JP2019/037490
§ 371 (c)(1),
(2) Date: Mar. 17, 2021

(87) PCT Pub. No.: WO2020/071194
PCT Pub. Date: Apr. 9, 2020

(65) Prior Publication Data
US 2021/0371711 A1    Dec. 2, 2021

(30) Foreign Application Priority Data
Oct. 1, 2018 (JP) .................. 2018-186323

(51) Int. Cl.
| | |
|---|---|
| *C09J 107/00* | (2006.01) |
| *C08F 253/00* | (2006.01) |
| *C08K 5/00* | (2006.01) |
| *C08K 5/12* | (2006.01) |
| *C09J 7/24* | (2018.01) |
| *C09J 7/38* | (2018.01) |
| *C09J 7/50* | (2018.01) |
| *C09J 151/04* | (2006.01) |

(52) U.S. Cl.
CPC ........... *C09J 107/00* (2013.01); *C08F 253/00* (2013.01); *C09J 7/245* (2018.01); *C09J 7/383* (2018.01); *C09J 7/50* (2018.01); *C09J 151/04* (2013.01); *C08K 5/0016* (2013.01); *C08K 5/12* (2013.01); *C09J 2203/302* (2013.01); *C09J 2301/208* (2020.08); *C09J 2407/00* (2013.01); *C09J 2407/003* (2013.01); *C09J 2427/006* (2013.01); *C09J 2451/00* (2013.01); *C09J 2451/003* (2013.01)

(58) Field of Classification Search
None
See application file for complete search history.

(56) References Cited

U.S. PATENT DOCUMENTS

| | | | |
|---|---|---|---|
| 2014/0099503 A1* | 4/2014 | Kubo | ............. C09J 7/241 428/353 |
| 2015/0053478 A1 | 2/2015 | Kawaguchi et al. | |
| 2017/0148552 A1 | 5/2017 | Mochizuki et al. | |
| 2017/0213618 A1 | 7/2017 | Kawaguchi et al. | |
| 2017/0306186 A1 | 10/2017 | Ichikawa et al. | |
| 2018/0105723 A1 | 4/2018 | Kubo et al. | |
| 2020/0071573 A1 | 3/2020 | Yokozuka et al. | |
| 2021/0139743 A1* | 5/2021 | Sawamura | ............. C09J 107/00 |

FOREIGN PATENT DOCUMENTS

| | | | |
|---|---|---|---|
| EP | 3 636 722 A1 | 4/2020 | |
| JP | H11-007856 A | 1/1999 | |
| JP | 2001-302965 A | 10/2001 | |
| JP | 2001-348547 A | 12/2001 | |
| JP | 2011-104840 A | 6/2011 | |
| JP | 2013-168322 A | 8/2013 | |
| JP | 2016-056270 A | 4/2016 | |
| JP | 2017-193620 A | 10/2017 | |
| JP | 2017-200977 A | 11/2017 | |
| JP | 2017200977 A | * 11/2017 |
| WO | 01/60939 A1 | 8/2001 | |
| WO | 2009/139347 A1 | 11/2009 | |
| WO | 2012/165449 A1 | 12/2012 | |
| WO | 2018/168990 A1 | 9/2018 | |
| WO | 2018/225541 A1 | 12/2018 | |

OTHER PUBLICATIONS

JP2017200977 English Machine Translation, created Dec. 13, 2023. (Year: 2023).*
Nov. 2, 2021 Extended European Search Report issued in European Patent Application No. 19868655.2.
Dec. 3, 2019 International Search Report issued in International Patent Application No. PCT/JP2019/037490.
Jan. 26, 2023 Office Action issued in European Patent Application No. 19868655.2.

* cited by examiner

*Primary Examiner* — Christopher M Rodd
(74) *Attorney, Agent, or Firm* — Oliff PLC

(57) ABSTRACT

An adhesive sheet in which the adhesive strength of an adhesive layer to other adherends is low, adhesive layers can be firmly bonded to each other, the adhesive layers will not be destroyed even if the adhesive layers are peeled after having once been bonded, and sufficient bonding strength is obtained even if the adhesive layers are re-bonded. An adhesive sheet in which an intermediate layer containing methyl methacrylate-grafted natural rubber is provided on a substrate containing a vinyl chloride resin and a plasticizer, and an adhesive layer including an adhesive containing the plasticizer and a rubber component containing natural rubber and methyl methacrylate-grafted natural rubber is provided on the intermediate layer, wherein a degree of swelling of the rubber component with respect to the plasticizer is by a factor of 1.5 to 4.5.

7 Claims, No Drawings

ADHESIVE SHEET

TECHNICAL FIELD

The present invention relates to an adhesive sheet that is suitable for binding and protecting lengthy articles.

BACKGROUND

Binding tape having polyvinyl chloride as a substrate is used for binding electric cables and wiring for buildings and the like. By bundling electric cables or wiring, then repeatedly winding tape thereon in a spiraling fashion, the electric cables or wiring can be bound, as well as provided with electrical insulation properties, heat resistance, flame retardance, wear resistance and the like. However, such methods that involve repeatedly winding tape require many working steps. Thus, in recent years, methods in which a single sheet is attached and fixed with strongly adhesive tape, such as double-sided tape, have increased for the purpose of reducing the number of steps, and sheets that are pre-equipped with double-sided tape for that purpose are known (Patent Documents 1 and 2).

Such double-sided adhesive tape is often provided with a peel sheet in order to prevent the adhesive layer and the substrate from becoming attached before use. The peel sheet must be peeled at the time of use, and there were problems in that the work required for peeling the peel sheet takes time, and in that the peel sheets become waste after being peeled. Therefore, as adhesive sheets that do not use peel sheets, sheets having an adhesive layer that is fused by heat (Patent Document 3), and tape and sheets in which the adhesive layers are bonded together by means of a pressure-sensitive adhesive are known (Patent Documents 4 and 5).

CITATION LIST

Patent Literature

Patent Document 1: JP 2011-104840 A
Patent Document 2: JP 2001-348547 A
Patent Document 3: JP H11-7856A
Patent Document 4: JP 2013-168322 A
Patent Document 5: JP 2016-056270 A

SUMMARY OF INVENTION

Technical Problem

However, with the method described in Patent Document 3, work is required for compression bonding by means of a thermal fusing machine, thereby prolonging the work time. Additionally, the method cannot be used if an article to be protected has low heat resistance. Additionally, with the adhesive tape described in Patent Document 4, the adhesive strength of the adhesive surface is too high, making the adhesive tape difficult to handle, and thus resulting in poor productivity.

Patent Document 5 describes an adhesive sheet using natural rubber to which methyl methacrylate has been graft-polymerized. With this adhesive sheet, adhesive surfaces can be bonded to each other due to the adhesiveness thereof while having low adhesive strength to other adherends, making the adhesive sheet easy to handle. However, since the adhesive strength is low, there is a risk of peeling in applications requiring high adhesive strength, such as wiring in electrical construction. Additionally, if the adhesive tape is erroneously bonded during installation, the adhesive tape must be able to be peeled without destroying the adhesive layer (so-called peelability) and to provide a similar level of adhesive strength when bonded again (so-called re-adherability). However, with the adhesive sheet described in Patent Document 5, so-called anchoring defects occur, such that if an attempt is made to peel apart the adhesive sheet after it has once been bonded, the adhesive layer is peeled from the substrate. Thus, the adhesive sheet cannot be peeled and re-adhered.

The present invention was made in consideration of the above-mentioned circumstances, and an objective thereof is to provide an adhesive sheet in which the adhesive strength of the adhesive layer to other adherends is low, adhesive layers can be firmly bonded to each other, the adhesive layer will not be destroyed even if the adhesive layer is peeled after having once been bonded, and sufficient bonding strength is obtained even if the adhesive layer is re-bonded.

Solution to Problem

As a result of diligent research, the present inventors discovered that the above-mentioned problem can be solved by an adhesive sheet having specific features, thereby completing the present invention.

Specifically, the present invention is as indicated below.
(1) An adhesive sheet in which an intermediate layer containing methyl methacrylate-grafted natural rubber (B) is provided on a substrate containing a vinyl chloride resin and a plasticizer (A), and an adhesive layer comprising an adhesive containing the plasticizer (A) and a rubber component (C) containing natural rubber (C1) and methyl methacrylate-grafted natural rubber (C2) is provided on the intermediate layer, wherein a degree of swelling of the rubber component (C) with respect to the plasticizer (A) is by a factor of 1.5 to 4.5.
(2) The adhesive sheet according to (1), wherein a plasticizer (A) content in 100 mass % of the adhesive is 5 to 35 mass %.
(3) The adhesive sheet according to (1) or (2), wherein the methyl methacrylate/natural rubber ratio of the rubber component (C) is 3/97 to 30/70 mass %.
(4) The adhesive sheet according to any one of (1) to (3), further containing, in the intermediate layer, 100 parts by mass or less of a synthetic rubber relative to 100 parts by mass of the methyl methacrylate-grafted natural rubber (B) contained in the intermediate layer.
(5) The adhesive sheet according to any one of (1) to (4), wherein the gel fraction in the rubber component (C) is 50 to 100 mass %.
(6) The adhesive sheet according to any one of (1) to (5), wherein the plasticizer (A) contained in the substrate and the adhesive layer is diisononyl phthalate (DINP).
(7) The adhesive sheet according to any one of (1) to (6), for binding and protecting an electric cable.

Effects of Invention

According to the adhesive sheet of the present invention, the adhesive strength of the adhesive layer to other adherends is low, yet adhesive layers can be firmly bonded to each other, thereby allowing the adhesive sheet to be bonded to only desired areas and making the adhesive sheet easy to handle. Additionally, even if the adhesive sheet is peeled after once being bonded, the adhesive layer is not destroyed and sufficient bonding strength is obtained even when re-bonded, thereby preventing installation defects due to erroneous bonding. Thus, the adhesive sheet can be suitably used, for example, in electrical construction applications, for binding and protecting lengthy articles such as electric cables and wiring.

DESCRIPTION OF EMBODIMENTS

Hereinafter, an embodiment of the present invention will be explained in detail. The present invention is not limited to the embodiment below and may be implemented by adding appropriate modifications within a range not inhibiting the effects of the present invention.

The adhesive sheet of the present embodiment is provided with a substrate, an intermediate layer on the substrate, and an adhesive layer on the intermediate layer. The intermediate layer serves the role of making the substrate adhere to the adhesive layer. The adhesive layer is a pressure-sensitive adhesive layer that is adhered by being bonded together with a small amount of pressure from a hand or the like. The adhesive layer achieves adhesive strength between adhesive layers by being wrapped around a lengthy article or the like so that the adhesive surfaces are on the inside, and bonding the adhesive surfaces to each other, thereby allowing the lengthy article or the like to be bound.

<Substrate>

In the substrate, it is essential to use a vinyl chloride resin because the adhesive sheet must have electrical insulation properties, heat resistance and flame retardance, and also must have both strength and flexibility for the purpose of bundling lengthy articles and protecting them from various environments.

Vinyl chloride resins include polyvinyl chloride, vinyl chloride-vinyl acetate copolymers, vinyl chloride-ethylene copolymers, vinyl chloride-propylene copolymers, and the like. These vinyl chloride resins may be used singly or by selecting two or more types. Among the above, polyvinyl chloride is preferable for having exceptional flexibility, stretchability, and moldability, while being able to be used in a general manner and inexpensively.

Although the degree of polymerization of the polyvinyl chloride is not particularly limited, particularly good workability can be obtained by setting the degree of polymerization to be preferably 500 to 4000, more preferably 800 to 3000, and even more preferably 1000 to 2000.

The substrate includes a plasticizer in order to impart flexibility, stretchability, and workability. As the plasticizer, it is possible to use phthalate plasticizers, isophthalate plasticizers, terephthalate plasticizers, adipate plasticizers, polyester plasticizers based on the above, phosphate plasticizers, trimellitate plasticizers, epoxy plasticizers, and the like. Specific examples of plasticizers include DINP (diisononyl phthalate), DHP (diheptyl phthalate), DOP (di-2-ethylhexyl phthalate), n-DOP (di-n-octyl phthalate), DIDP (diisodecyl phthalate), DOIP (di-2-ethylhexyl isophthalate), DOTP (di-2-ethylhexyl terephthalate), BBP (benzylbutyl phthalate), TOTM (tri-2-ethylhexyl trimellitate), DOA (di-2-ethylhexyl adipate), TCP (tricresyl phosphate), BOA (benzyloctyl adipate), polyesters (adipic acid-propylene glycol-based polyesters, adipic acid-butylene glycol-based polyesters, phthalic acid-propylene glycol-based polyesters), DPCP (diphenylcresyl phosphate), diisodecyl adipate, epoxidized soybean oil, epoxidized linseed oil, chlorinated paraffin, and the like. These plasticizers may be used singly or by selecting two or more types. Preferably, a phthalate plasticizer, which is inexpensive and has high plasticizing effects, is used, and more preferably, DINP is used.

The amount of the plasticizer (A) contained in the substrate is preferably 20 to 100 parts by mass, more preferably 30 to 80 parts by mass, and even more preferably 40 to 60 parts by mass relative to 100 parts by mass of the polyvinyl chloride resin. If there are 20 parts by mass or more of the plasticizer, then the stretchability improves, which is advantageous when a lengthy protected article is to be bent after the protected article has been covered. If there are 100 parts by mass or less of the plasticizer, then the wear resistance improves, making the protected article less susceptible to damage due to wear.

The plasticizer (A) in the substrate must have difficulty dissolving the adhesive to be mentioned below, and must make the adhesive swell. If the adhesive is soluble in the plasticizer (A), then when the plasticizer that has seeped out from the substrate is transferred to the adhesive, the adhesive will dissolve and will not be able to retain its structure. Additionally, if the adhesive has difficulty becoming swollen with the plasticizer (A), then the plasticizer that has seeped out from the substrate will remain on the surface layer of the adhesive surface, thereby largely suppressing the adhesive strength.

Fillers, modifiers, other additives, and the like may be blended into the substrate, as needed, within a range not inhibiting the effects of the present invention. The other additives may be colorants, stabilizers, antioxidants, ultraviolet absorbers, lubricants, and the like.

The aforementioned fillers include, for example, aluminum hydroxide, magnesium hydroxide, zirconium hydroxide, calcium hydroxide, potassium hydroxide, barium hydroxide, triphenyl phosphite, ammonium polyphosphate, polyphosphoric acid amide, zirconium oxide, magnesium oxide, zinc oxide, titanium oxide, molybdenum oxide, guanidine phosphate, hydrotalcite, smectite, zinc borate, anhydrous zinc borate, zinc metaborate, barium metaborate, antimony oxide, antimony trioxide, antimony pentoxide, red phosphorus, talc, alumina, silica, boehmite, bentonite, silicate soda, calcium silicate, calcium sulfate, calcium carbonate, magnesium carbonate, carbon black, and the like. These fillers may be used singly or by selecting two or more types. Preferably, talc, alumina, silica, calcium silicate, calcium sulfate, calcium carbonate, or magnesium carbonate is used, and more preferably, calcium carbonate, which provides excellent economic performance, is used.

The aforementioned fillers may be obtained by powdering a natural substance, or may be obtained by neutralizing and precipitating an aqueous solution. Additionally, functional groups may be introduced by means of a surface treatment agent or the like. As the surface treatment agent, a fatty acid, a rosin acid, a lignin acid, a quaternary ammonium salt, or the like may be used.

As the aforementioned modifiers, there are, for example, vinyl chloride-vinyl acetate copolymers, vinyl chloride-ethylene copolymers, vinyl chloride-propylene copolymers, chlorinated polyethylenes, chlorinated polyvinyl chlorides, ethylene-vinyl acetate copolymers, acrylonitrile-butadiene-styrene copolymers, methyl methacrylate-butadiene-styrene copolymers, acrylonitrile-butadiene copolymers, methyl methacrylate-butyl acrylate copolymers, thermoplastic polyurethanes, polyester-based thermoplastic elastomers, and the like. These modifiers may be used singly or by selecting two or more types.

The contained amounts of the filler, the modifier, and the other additives are not particularly limited, and they may be blended within a range not inhibiting the effects of the present invention. For example, the amount may be more than 0 parts by mass and not more than 50 parts by mass relative to 100 parts by mass of the above-mentioned resin.

The method for molding the substrate may be a method of obtaining the substrate by melt-kneading a composition in which a resin, a plasticizer, a filler, a modifier, other additives, and the like are mixed. Although the melt-kneading method is not particularly limited, various types of mixers and kneaders provided with heating devices, such as twin-screw extruders, continuous and batch kneaders, rollers, and Banbury mixers, may be used to mix the composition so as to be homogeneously dispersed. The mixture that is thus obtained is molded into a substrate by means of calendering, T-die extrusion, inflation, or the like, these being commonly used molding methods. The molder is preferably a calender molder for the purposes of productivity, color change, shape uniformity, and the like. A known system such as, for example, an L-type system, a reverse-L-type system, a Z-type system, or the like can be adopted for the roller arrangement system for calender molding, and the roller temperature should normally be set to 150 to 200° C., and preferably 155 to 190° C.

The thickness of the substrate may be various values in accordance with the purpose and manner of use or the like, but is preferably 50 to 2000 μm, and more preferably 100 to 1000 μm.

<Intermediate Layer>

In the intermediate layer, natural rubber to which methyl methacrylate has been graft-polymerized (hereinafter referred to as "methyl methacrylate-grafted natural rubber") is used. Since methyl methacrylate-grafted natural rubber has affinity with polyvinyl chloride resins and natural rubber, using this material allows a substrate comprising a polyvinyl chloride resin to be bonded to an adhesive layer comprising natural rubber. Without the intermediate layer, so-called anchoring defects occur, such that after adhesive surfaces have been bonded to each other, separation occurs at the interface between the substrate layer and the adhesive layer at the time of peeling.

In the methyl methacrylate-grafted natural rubber (B), it is essential for methyl methacrylate to be copolymerized. However, other (meth)acrylate monomers aside from methyl methacrylate may also be copolymerized, including, for example, methyl acrylate, ethyl acrylate, n-butyl acrylate, i-butyl acrylate, t-butyl acrylate, 2-ethylhexyl acrylate, methyl methacrylate, ethyl methacrylate, n-butyl methacrylate, i-butyl methacrylate, t-butyl methacrylate, 2-ethylhexyl methacrylate, 2-hydroxyethyl acrylate, 2-hydroxyethyl methacrylate, acrylic acid, methacrylic acid, acrylamide, methacrylamide, N-methyl acrylamide, N-isopropyl acrylamide, N,N-dimethyl acrylamide, acrylonitrile, and the like.

The methyl methacrylate/natural rubber ratio in the methyl methacrylate-grafted natural rubber (B) is preferably 10/90 to 30/70 mass %, more preferably 20/80 to 60/40 mass %, and even more preferably 30/70 to 50/50 mass %. In the case in which natural rubber to which methyl methacrylate has not been graft-polymerized is used in the intermediate layer, so-called anchoring defects occur, such that after adhesive surfaces have been bonded to each other, separation occurs at the interface between the substrate layer and the adhesive layer at the time of peeling.

A synthetic rubber may be added to the intermediate layer as needed. By adding an appropriate synthetic rubber, the re-peelability can be further improved, and the adhesive strength between the adhesive surfaces can be kept high after re-peeling. Examples of the synthetic rubber include butadiene rubber, isoprene rubber, styrene-butadiene rubber, acrylonitrile-butadiene rubber, methyl methacrylate butadiene rubber, isobutylene rubber (butyl rubber), chloroprene rubber, acrylic rubber, a thermoplastic elastomer (such as, for example, an ethylene-propylene rubber, an ethylene-propylene-diene rubber, a styrene-butadiene-styrene block copolymer, a styrene-isoprene-styrene block copolymer, a styrene-ethylene-styrene copolymer, a styrene-ethylene-butylene-styrene copolymer, or a styrene-ethylene-propylene-styrene copolymer), acrylic rubber, urethane rubber, and the like. In particular, it is preferable to add acrylic rubber (ACM), acrylonitrile-butadiene rubber (NBR), or methyl methacrylate butadiene rubber (MBR). The amount of synthetic rubber that is added should preferably be 100 parts by mass or less relative to 100 parts by mass of methyl methacrylate-grafted natural rubber (B).

The intermediate layer may contain an additive such as a surfactant, a viscosity adjuster, an anti-aging agent, a plasticizer, or a filler, within a range not inhibiting the effects of the present invention. In the case in which an additive is contained, the contained amount thereof is not particularly limited, and may be 50 mass % or less of the adhesive layer.

As the method for forming the intermediate layer, a conventionally known method may be used. For example, it may be formed by a method of coating one surface of the substrate by a method using a forward-rotating roller system, a reverse roller system, a gravure roller system, a spray system, a kiss roller system, a bar system, a knife system, a comma system, a lip die system, or the like.

The thickness of the intermediate layer should preferably be 0.1 to 3.0 μm, more preferably 0.2 to 2.0 μm, and even more preferably 0.3 to 1.0 μm for the purposes of maintaining the structure of the intermediate layer and the adhesive strength between the substrate and the adhesive layer.

<Adhesive>

The adhesive constituting the adhesive layer essentially contains a rubber component (C) and a plasticizer (A). The rubber component (C) essentially contains natural rubber (C1) and methyl methacrylate-grafted natural rubber (C2). By using natural rubber (C1), the adhesive strength between adhesive surfaces can be made high, while keeping the adhesive strength (back-surface adhesive strength) with the surface on the back side of the adhesive surface low. Additionally, by using an appropriate amount of methyl methacrylate-grafted natural rubber (C2), the adherence with the intermediate layer is improved and the peelability is improved, thereby allowing the adhesive surfaces to be re-bonded.

As specific examples of natural rubber (C1), unmodified natural rubber is the most preferable, but natural rubber crosslinked with a sulfur compound or an organic peroxide compound, or natural rubber depolymerized by kneading or organic peroxide treatment may be used. Additionally, latex from which impurities have been removed by centrifugation, defatting or deproteinization may be used. However, copolymers with other monomers to be mentioned below are not included therein.

Methyl methacrylate-grafted natural rubber (C2) is obtained by graft-copolymerizing methyl methacrylate to natural rubber. The graft monomers may be of one type, or multiple types mentioned above may be copolymerized.

The rubber component (C) may contain other types of synthetic rubber as needed. Specific examples of synthetic rubber include butadiene rubber, isoprene rubber, styrene-butadiene rubber, acrylonitrile-butadiene rubber, methyl methacrylate butadiene rubber, isobutylene rubber (butyl rubber), chloroprene rubber, acrylic rubber, or a thermoplastic elastomer (an ethylene-propylene rubber, an ethylene-propylene-diene rubber, a styrene-butadiene-styrene block copolymer, a styrene-isoprene-styrene block copolymer, a styrene-ethylene-styrene copolymer, a styrene-ethylene-butylene-styrene copolymer, or a styrene-ethylene-propylene-styrene copolymer).

The methyl methacrylate/natural rubber ratio in the rubber component (C) is preferably 3/97 to 30/70 mass %, more preferably 3/97 to 24/76 mass %, and even more preferably 3/97 to 18/82 mass %. Due to the methyl methacrylate/natural rubber ratio being the above-mentioned lower limit value or higher, when the adhesive sheet is peeled, separation occurs evenly between the adhesive surfaces, and the adhesive strength between the adhesive surfaces can be maintained when the adhesive sheet is re-bonded. Due to the methyl methacrylate ratio being the above-mentioned upper limit value or lower, the adhesive strength (back-surface adhesive strength) with the surface on the back side of the adhesive surface can be lowered.

The rubber component (C) must not easily dissolve in the plasticizer (A) and must be able to swell therewith. If the rubber component (C) is highly soluble in the plasticizer (A), then when the plasticizer that has seeped out from the substrate is transferred to the rubber component (C), the rubber component (C) dissolves and the structure cannot be maintained. Additionally, if the rubber component (C) does not swell due to the plasticizer (A), then the plasticizer that has seeped out from the substrate will remain on the surface layer of the adhesive surface, thereby greatly inhibiting the adhesive strength.

The degree of swelling of the rubber component (C) with respect to the plasticizer (A) must essentially be by a factor of 1.5 to 4.5, preferably 2.0 to 4.0, and even more preferably 2.3 to 3.7. If the degree of swelling is by a factor of less than 1.5, then the plasticizer (A) cannot be fully absorbed by the rubber component (C), so that some will bleed out onto the surface of the adhesive layer, thereby reducing the adhesive strength. If the degree of swelling is by a factor of more than 4.5, then the plasticizer (A) in the substrate tends to transfer to the rubber component (C), thereby raising the tack. The degree of swelling can, for example, be measured by the method indicated below.

Sampling method for rubber component (C): Bemcot M-1 (manufactured by Asahi Kasei Corp.) soaked with toluene is pressed against the adhesive surface side of an adhesive sheet, and the adhesive is scraped off. With respect to 100 parts by mass of ethanol, 1 part by mass of the obtained adhesive is added, then a stopper-equipped Erlenmeyer flask is set in a constant-temperature water bath (50° C.±2° C.), and the sample is stirred for 2 hours with a stirrer at a rotation speed of 600 rotations/min. After the sample has been stirred, the stopper-equipped Erlenmeyer flask is cooled with ice water to 23° C. or lower, then the entire amount of the sample is filtered through a 270-mesh wire screen, the weight of which has been pre-measured. After filtration, the insoluble part is heated for 10 minutes at 150° C. to obtain the rubber component (C).

Measurement of degree of swelling: With respect to 1.00 g of the rubber component (C) obtained by the above-described method, 100 g of the plasticizer (A) is added with a volumetric pipette, and after placing a stirrer bar therein, the sample is sealed. A stopper-equipped Erlenmeyer flask is set in a constant-temperature water bath (50° C.±2° C.), and the sample is stirred for 2 hours with a stirrer at a rotation speed of 600 rotations/min. After the sample has been stirred, the stopper-equipped Erlenmeyer flask is cooled with ice water to 23° C. or lower, then the entire amount of the sample is filtered through a 270-mesh wire screen, the weight of which has been pre-measured (the weight of the wire screen before filtration is represented by $W1$ (g)). The weight of the wire screen after filtration is measured (the weight of the wire screen after filtration is represented by $W2$ (g)), and the degree of swelling of the rubber component (C) with respect to the plasticizer (A) is computed by means of the following expression:

$$\text{Degree of swelling: } (W2-W1)/1.00$$

The insoluble fraction (gel fraction) of the rubber component (C) is preferably 50 to 100 mass %, more preferably 60 to 100 mass %, and even more preferably 70 to 100 mass %. If the gel fraction is 50 mass % or higher, stickiness of the adhesive layer tends not to occur. The insoluble fraction can be measured by the two methods indicated below, either of which may be selected.

Measurement method 1: The metal screen obtained by the above-described measurement of the degree of swelling is heated in an explosion-proof oven for 1 hour at the boiling point of the plasticizer (A)+30° C., then the weight of the metal screen is measured (the weight of the metal screen after drying is represented by $W3$ (g)). Using $W1$ to $W3$ obtained by the above-described measurements of the degree of swelling, the gel fraction is computed by means of the following expression:

$$\text{Gel fraction (mass \%)}=[(W3-W1)/(W2-W1)]\times 100$$

Measurement method 2: Approximately 1 µg of the filtrate in the above-described measurement of the degree of swelling is analyzed by using LC-MS to measure the mass X (µg) of the rubber component in the filtrate, and the gel fraction is computed by means of the following expression:

$$\text{Gel fraction (mass \%)}=(1-X)\times 100$$

The degree of swelling and the gel fraction of the rubber component (C) can be adjusted by the component ratio between the natural rubber (C1) and the methyl methacrylate-grafted natural rubber (C2), the component ratio between the methyl methacrylate and the natural rubber in the methyl methacrylate-grafted natural rubber, the modification state of the natural rubber (whether or not crosslinking, kneading, depolymerization, defatting, or deproteinization is performed), the addition of other rubber components, and the like.

The test solvent for measuring the degree of swelling of the rubber component (C) must essentially use a plasticizer (A). However, as the test solvent for the gel fraction, the following solvents may be used instead of the plasticizer (A):

Usable solvents: aromatic hydrocarbons such as benzene, toluene, o-xylene, m-xylene, p-xylene, and the like; aliphatic hydrocarbons such as hexane, heptane, and octane; alicyclic hydrocarbons such as cyclohexane, methylcyclohexane, 1,2-dimethylcyclohexane, 1,3-dimethylcyclohexane, and 1,4-dimethylcyclohexane; halogenated hydrocarbons such as methyl chloride, methylene chloride, chloroform, and carbon tetrachloride; ketones such as acetone, methylethylketone, and methylisobutylketone; ethers such as diethylether and dibutylether; cyclic ethers such as tetrahydrofuran; aliphatic carboxylic acid esters such as ethyl acetate, butyl acetate, and adipic acid diesters; aromatic carboxylic acid esters such as benzoic acid esters, phthalic acid esters, and trimellitic acid triesters; and aprotic polar solvents such as N,N-dimethylformamide (DMF) and dimethylsulfoxide (DMSO)

As the method for forming the adhesive sheet, it may be obtained, for example, by a method of coating one surface of a substrate with a solution, an emulsion, or a dispersion of an adhesive containing an elastomer in which a tackifier, a filler such as inorganic fine particles, a plasticizer, a surfactant, a viscosity adjuster, an anti-aging agent, another additive, or the like are mixed, with a primer layer (intermediate layer) therebetween, then drying the sheet by means of a drying furnace, and rolling the sheet into a roll.

The coating method may be a method using a forward-rotating roller system, a reverse roller system, a gravure roller system, a spray system, a kiss roller system, a bar system, a knife system, a comma system, a lip die system, or the like. Additionally, the format of the above-mentioned adhesive should preferably be one using an emulsion or a dispersion with water for the purposes of safety and the environmental burden.

In the adhesive sheet of the present invention, for the purposes of relieving stress at the time of rolling, improving the adherence between the intermediate layer and the adhesive layer, raising the affinity between the adhesive layer components, and the like, the adhesive sheet of the present invention, rolled in the form of a roll, may be aged for a prescribed duration or heat-treated at a prescribed temperature. The aging and heat treatments are preferably performed for durations and at temperatures at which the performance of the adhesive sheet is sufficiently stable. Particularly in the case of the adhesive sheet of the present invention, they should preferably be performed at temperatures at least as high as the softening points or the glass transition points of the intermediate layer and the adhesive layer. The temperature during heat treatment of the adhesive sheet is preferably at least 100° C. and at most 130° C., and the duration should preferably be at least 1 hour and at most 6 hours.

As the plasticizer contained in the adhesive layer, the same component as the plasticizer (A) in the substrate is essentially contained. An adhesive layer that does not contain a plasticizer has insufficient adhesiveness, and adhesive strength is not obtained when the adhesive layers are bonded to each other. Additionally, if the plasticizer included in the adhesive layer is a component different from the plasticizer (A) in the substrate, then the components constituting the plasticizers will change during storage and the performance will not be stable. Methods for providing an adhesive layer containing a plasticizer include a method of forming an adhesive layer into which a rubber component and a plasticizer have been pre-mixed on the intermediate layer, a method of forming an adhesive layer comprising a rubber component but not containing a plasticizer on the intermediate layer and then further coating the adhesive layer with a plasticizer, and a method of forming an adhesive layer comprising a rubber component but not containing a plasticizer on the intermediate layer and then transferring the plasticizer in the substrate to the adhesive layer by means of heat treatment or the like.

The amount of the plasticizer (A) contained in the adhesive is preferably 5 to 35 mass %, more preferably 10 to 30 mass %, and even more preferably 15 to 25 mass % relative to 100 mass % of the adhesive. By containing 5 mass % or more of the plasticizer (A), the adhesive surfaces are sufficiently adhered to each other, and the adhesive strength between the adhesive surfaces becomes high. Additionally, by containing 35 mass % or less of the plasticizer (A), the tack of the adhesive surfaces can be kept low.

Although the aforementioned adhesive may contain a tackifier as needed, an adhesive containing a tackifier will become sticky and become poorly suited to being used as an adhesive sheet. Thus, the amount of the tackifier should preferably be less than 20 mass % relative to 100 mass % of the adhesive. The aforementioned tackifier may be a rosin resin or a hydrogenated rosin resin, a rosin ester resin, a rosin-modified phenol resin, a phenol resin, an alkyl phenol resin, a terpene resin, a terpene phenol resin, a coumarone resin, an indene resin, a coumarone-indene resin, a coumarone-indene-styrene resin, a styrene resin, a xylene resin, a styrene-maleic acid resin, an aliphatic petroleum resin, an alicyclic petroleum resin, an aromatic petroleum resin, an aliphatic/aromatic copolymer petroleum resin, or the like. These tackifiers may be used singly or by selecting two or more types.

The aforementioned adhesive may contain inorganic fine particles as needed. An adhesive containing an appropriate amount of inorganic fine particles can reduce the back-surface adhesive strength while maintaining a certain level of adhesiveness between the adhesive surfaces. Specific examples of the aforementioned inorganic fine particles include silica, talc, alumina, silicate soda, calcium silicate, calcium sulfate, calcium carbonate, magnesium carbonate, magnesium oxide, zinc oxide, titanium oxide, boehmite, bentonite, hydrotalcite, and the like. Silica, alumina, and calcium carbonate, which have excellent workability and safety, are preferred, and calcium carbonate, which has excellent economic performance, is more preferred. The fine particles may be used singly or by combining two or more types. The amount of the inorganic fine particles that are contained should preferably be 50 mass % or less, and more preferably 1 to 25 mass % relative to 100 mass % of the adhesive. If the amount of inorganic fine particles that are contained exceeds 50 mass %, then there is a risk that the adhesive strength will become low. Thus, it should preferably be 50 mass % or lower.

The adhesive may contain a surfactant, a viscosity adjuster, an anti-aging agent, or another additive, within a range not inhibiting the adhesive performance. The content of these additives in the adhesive is not particularly limited, but should preferably be 20 mass % or less relative to 100 mass % of the adhesive layer.

The thickness of the adhesive layer, for the purposes of obtaining adhesive strength and maintaining the structure of the adhesive layer, should preferably be 3 to 100 μm, and more preferably 10 to 50 μm. By setting the thickness of the adhesive layer to be 3 μm or more, sufficient adhesive strength can be obtained. Additionally, by setting the thickness of the adhesive layer to be 100 μm or less, the structure of the adhesive layer can be sufficiently maintained, and cohesive failure of the adhesive will become less likely to occur.

The adhesive strength between the adhesive surfaces of the adhesive sheet should preferably be 8 N or more, more preferably 10 N or more, and even more preferably 12 N or more for a width of 15 mm. It is better for the adhesive strength between the adhesive layers to be higher. The method for measuring the adhesive strength between the adhesive surfaces is as described below. Two test pieces of width 15 mm×length 120 mm are prepared, the adhesive layers of the test pieces are bonded together over an area of 15 mm×100 mm, in a 23° C. environment, by having a compression bonding roller with a load of 2 kg, moving at a speed of 5 mm per second, perform one round trip, after which the test pieces are allowed to rest for 20 minutes. Next, the load when the two test pieces are peeled apart at a speed of 300 mm/minute in a 23° C. environment is measured. The peeling direction of the test pieces is set to be such that the angle between the two test pieces is 180° after being peeled apart.

The back-surface adhesive strength of the adhesive sheet should preferably be 0.1 N or less, more preferably 0.05 N or less, and even more preferably 0.03 N or less for a width of 50 mm. It is better for the back-surface adhesive strength to be lower. The method for measuring the back-surface adhesive strength is as described below. Two test pieces of width 15 mm×length 120 mm are prepared, an adhesive surface of a test piece is bonded with the surface (back-surface) on the back side of an adhesive surface over an area of 15 mm×100 mm, in a 23° C. environment, by having a compression bonding roller with a load of 2 kg, moving at a speed of 5 mm per second, perform one round trip, after which the test pieces are allowed to rest for 20 minutes. Next, the load when the two test pieces are peeled apart at a speed of 300 mm/minute in a 23° C. environment is measured. The peeling direction of the test pieces is set to be such that the angle between the two test pieces is 180° after being peeled apart.

The probe tack of the adhesive surface of the adhesive sheet is preferably 3 N/cm$^2$ or lower, more preferably 2.5 N/cm$^2$ or lower, and even more preferably 2 N/cm$^2$ or lower. If the probe tack is 3 N/cm$^2$ or lower, then when used to bundle and protect a lengthy article such as an electric cable, the adhesive sheet will not tend to stick to the lengthy article. It is better for the probe tack to be lower. The probe tack is measured in accordance with the ASTM D 2979 standard, using a probe tack tester (NS PROBE TACK TESTER, manufactured by Nichiban Co., Ltd.), by bringing a cylindrical probe having a diameter of 5 mm into contact therewith at a speed of 1 cm/s in a 23° C. environment, retaining contact for 0.02 seconds, and measuring the load when pulling the probe away at a speed of 1 cm/s.

The ball number of the ball tack of the adhesive surface of the adhesive sheet is preferably 5 or lower, more preferably 3 or lower, and even more preferably 1 or lower. If the ball number is 5 or lower, then when used to bundle and protect a lengthy article such as an electric cable, the adhesive sheet will not tend to stick to the lengthy article. It is better for the ball tack to be lower. The ball tack is measured in accordance with the JIS Z 0237 standard, using a ball tack tester (PI-1201, manufactured by Tester Sangyo Co., Ltd.), by setting the inclination angle at 30 degrees and determining the ball number of a steel ball that stops within a measurement area.

The adhesive sheet preferably has a 100% tensile modulus, in accordance with the JIS K 6251 standard, of 5 to 50 MPa, more preferably 10 to 40 MPa, and even more preferably 15 to 30 MPa. If the 100% tensile modulus is 5 MPa or higher, then the structure is fixed to a certain degree after binding, thus making it less likely for the binding to come loose. If the 100% tensile modulus is 50 MPa or lower, then appropriate flexibility is maintained even after binding, which is advantageous when the bound article is to be deformed.

The adhesive sheet preferably has a breaking strength, in accordance with the JIS K 6251 standard, of 10 to 200 MPa, more preferably 15 to 100 MPa, and even more preferably 20 to 40 MPa. If the breaking strength is 10 MPa or higher, then the mechanical durability of the bound article improves. If the breaking strength is 200 MPa or lower, then the workability when cutting the sheet to prescribed dimensions improves.

The adhesive sheet preferably has a breaking elongation, in accordance with the JIS K 6251 standard, of 50% to 500%, more preferably 100% to 300%, and even more preferably 150% to 250%. If the breaking elongation is 50% or higher, then the mechanical durability of the bound article improves. If the breaking elongation is 500% or lower, then the workability improves when the sheet is cut out to prescribed dimensions.

The adhesive sheet preferably has a volume resistivity, in accordance with the JIS K 6271 standard, of $1\times10^{10}$ Ω·cm or higher, more preferably $1\times10^{11}$ Ω·cm or higher, and even more preferably $1\times10^{12}$ Ω·cm or higher. If the volume resistivity is the above-mentioned values or higher, then the electrical insulation properties of the bound article are improved.

The adhesive sheet of the present invention can be used as a sheet for protecting the surface and the interior of a protected article from mechanical damage and wear, as well as for insulating the protected article from electricity, and for blocking irradiation by sunlight or the like. In particular, the adhesive sheet of the present invention can be favorably used as a sheet for covering a lengthy article such as an electric cable or wiring, then bonding together the adhesive surfaces, thereby binding and protecting the lengthy article.

EXAMPLES

Hereinafter, the present invention will be explained in detail by means of examples and comparative examples. However, the present invention is not limited by these examples. The raw materials of the substrate, the primer (intermediate layer), and the adhesive used in the present invention are indicated in Table 1.

Example 1

(Preparation of Substrate)

A substrate having a thickness of 400 µm was obtained by blending 40 parts by mass of DINP (manufactured by J-Plus Co., Ltd.), as a plasticizer, with respect to 100 parts by mass of polyvinyl chloride (TH-1000, manufactured by Taiyo Vinyl Corp.), as a vinyl chloride resin, blending appropriate amounts of a stabilizer, a lubricant and a filler therewith, and kneading the mixture for 10 minutes with a twin-roller mill with a roller temperature of 170° C.

(Preparation of Methyl Methacrylate-Grafted Natural Rubber)

As the methyl methacrylate-grafted natural rubber, a graft-polymerized rubber emulsion (MG50) obtained by adding 0.3 kg of methyl methacrylate, as a monomer, to 1.4 kg of a natural rubber emulsion (manufactured by Regitex), adding redox initiators (0.07 kg of benzoyl peroxide and 0.07 kg of tetraethylene pentamine), 0.02 kg of a surfactant, and purified water, then emulsion-polymerizing the mixture was used. The compositions of the methyl methacrylate-grafted natural rubbers used in the examples are indicated in Table 2.

(Preparation of Adhesive Emulsion)

An adhesive emulsion (A-1) was obtained by mixing 80 g of a methyl methacrylate-grafted natural rubber (MG50), 20 g of a natural rubber emulsion (manufactured by Regitex), and 20 g of a 50% emulsion of DINP (manufactured by J-Plus Co., Ltd.). The compositions of the adhesives used in the examples are indicated in Table 3.

(Preparation of Adhesive Sheet)

The surface of the above-mentioned substrate was coated with 100 parts by mass of a methyl methacrylate-grafted rubber (MG50) as a primer (intermediate layer) emulsion, and dried for 1 minute at 100° C., thereby forming a primer layer (intermediate layer) having a thickness of 1 µm on the surface of the substrate. Next, the surface of the primer layer (intermediate layer) was coated with the emulsion adhesive (A-1), and dried for 1 minute at 110° C. in an oven, thereby forming an adhesive sheet having a three-layered structure with a 400 μm-thick substrate/1 μm-thick intermediate layer/30 μm-thick adhesive layer. After rolling this adhesive sheet into a roll, the sheet was heat-treated for 2 hours at 110° C. The structures and the physical properties of the adhesive sheets used in the examples are indicated in Table 4.

Examples 2 to 19 and Comparative Examples 1 to 10

Adhesive sheets were obtained by methods similar to Example 1 aside from having changed the blend in the substrate, and the types and thicknesses of the methyl methacrylate-grafted natural rubber emulsion and the emulsion adhesive in Example 1. The compositions of the methyl methacrylate-grafted natural rubbers used in the examples and the comparative examples are indicated in Table 2, the compositions of the adhesives are indicated in Table 3, and the structures and the physical properties of the adhesive sheets are indicated in Tables 4 to 6.

[Qualitative Analysis of Plasticizer in Substrate and Adhesive]

Bemcot M-1 (manufactured by Asahi Kasei Corp.) soaked with toluene was pressed against the adhesive surface side of an adhesive sheet, the adhesive was scraped off, and the substrate was separated from the adhesive. The substrate and the adhesive were each subjected to GC-MS analysis, and diisononyl phthalate (DINP) was detected from both, thereby verifying that DINP, which is a plasticizer, was contained in substrate and the adhesive.

[Sampling and Evaluation of Rubber Component (C)]

Bemcot M-1 soaked with toluene was pressed against the adhesive surface side of an adhesive sheet, and the adhesive was scraped off. With respect to 100 parts by mass of ethanol, 1 part by mass of the obtained adhesive was added, then a stopper-equipped Erlenmeyer flask was set in a constant-temperature water bath (50° C.±2° C.), and the sample was stirred for 2 hours with a stirrer at a rotation speed of 600 rotations/min. After the sample was stirred, the stopper-equipped Erlenmeyer flask was cooled with ice water to 23° C. or lower, then the entire amount of the sample was filtered through a 270-mesh wire screen, the weight of which was pre-measured. After filtration, the insoluble part was heated for 10 minutes at 150° C. to obtain the rubber component (C). Regarding the obtained rubber component, the <Methyl methacrylate/natural rubber ratio> and the <Gel fraction> were measured by the methods indicated below, and the results are indicated in Tables 3 to 6. Additionally, the results for the <Degree of swelling> and the <Plasticizer content in the adhesive layer> are indicated in Tables 3 to 6.

<Methyl Methacrylate/Natural Rubber Ratio>

Approximately 10 mg of a sample of the rubber component (C) was impregnated with 800 μL of deuterochloroform. When the rubber component was not completely dissolved in the chloroform solution and swelling occurred, an ultrasonic treatment was performed to obtain a measurement sample. The methyl methacrylate/natural rubber weight ratio was computed by using the peak area due to 3.2 to 3.9 ppm of methyl methacrylate and the peak area due to 4.6 to 5.6 ppm of natural rubber in the obtained $^1$H-NMR.

<Degree of Swelling>

Approximately 1.00 g of a sample of the rubber component (C) was taken (the weight was measured to two digits beyond the decimal point) in a 200 ml stopper-equipped Erlenmeyer flask. As a solvent, approximately 100 g (the weight was measured to the integer digits) of the plasticizer DINP was added with a volumetric pipette, and after placing a stirrer bar therein, the flask was sealed. The stopper-equipped Erlenmeyer flask was set in a constant-temperature water bath (50° C.±2° C.), and the sample was stirred for 2 hours with a stirrer at a rotation speed of 600 rotations/min. After the sample was stirred, the stopper-equipped Erlenmeyer flask was cooled with ice water to 23° C. or lower, then the entire amount of the sample was filtered through a 270-mesh wire screen, the weight of which was pre-measured (the weight of the wire screen before filtration is represented by W1 (g)). The weight of the wire screen after filtration was measured (the weight of the wire screen after filtration is represented by W2 (g)). The degree of swelling of the rubber component (C) with respect to the plasticizer (A) was computed by means of the following expression:

Degree of swelling: $(W2-W1)/1.00$

<Gel Fraction>

Bemcot M-1 (manufactured by Asahi Kasei Corp.) soaked with toluene was pressed against the adhesive surface side of an adhesive sheet, and the adhesive was scraped off. With respect to 100 parts by mass of ethanol, 1 part by mass of the obtained adhesive was added, then a stopper-equipped Erlenmeyer flask was set in a constant-temperature water bath (50° C.±2° C.), and the sample was stirred for 2 hours with a stirrer at a rotation speed of 600 rotations/min. After the sample was stirred, the stopper-equipped Erlenmeyer flask was cooled with ice water to 23° C. or lower, then the entire amount of the sample was filtered through a 270-mesh wire screen, the weight of which was pre-measured. The components remaining after filtration were heated for 10 minutes at 150° C., the moisture was removed, the sample was added to a stopper-equipped Erlenmeyer flask containing 100 g of toluene, and after placing a stirrer bar therein, the flask was sealed. The stopper-equipped Erlenmeyer flask was set in a constant-temperature water bath (50° C.±2° C.), and the sample was stirred for 2 hours with a stirrer at a rotation speed of 600 rotations/min. After the sample was stirred, the stopper-equipped Erlenmeyer flask was cooled with ice water to 23° C. or lower, then the entire amount of the sample was filtered through a 270-mesh wire screen, the weight of which was pre-measured (the weight of the wire screen before filtration is represented by W1 (g) and the weight of the wire screen after filtration is represented by W2 (g)). After heating the sample for 1 hour at 150° C., the weight of the wire screen was measured. (The weight of the wire screen after drying is represented by W3 (g)). W1 to W3 obtained by the above-mentioned measurements were used to compute the gel fraction from the following expression:

Gel fraction (mass %)=$[(W3-W1)/(W2-W1)] \times 100$

<Plasticizer Content in Adhesive Layer>

Bemcot M-1 soaked with deuterochloroform was pressed against the adhesive surface side of an adhesive sheet, and the adhesive was scraped off. The adhesive was impregnated with 800 μL of deuterochloroform. When the adhesive did not dissolve in the chloroform solution, an ultrasonic treatment was performed to obtain a measurement sample. The $^1$H-NMR spectrum of the above-mentioned adhesive was compared with the $^1$H-NMR spectra of the plasticizer determined by GC-MS and the rubber component obtained beforehand, and the plasticizer content in the adhesive layer was quantified from the peak area ratio of the adhesive rubber component and the plasticizer.

The test pieces necessary for the respective evaluations were cut out from the above-mentioned adhesive sheets, and the <Probe tack>, the <Adhesive strength between adhesive surfaces>, the <Peelability>, the <Re-adherability> and the <Back-surface adhesive strength> were measured as evaluation methods. The evaluation results are indicated in Tables 3 to 6.

<Probe Tack>

The probe tack was measured in accordance with the ASTM D 2979 standard, using a probe tack tester (NS PROBE TACK TESTER, manufactured by Nichiban Co., Ltd.), by bringing a cylindrical probe having a diameter of 5 mm into contact with a sample at a speed of 1 cm/s in a 23° C. environment, retaining contact for 0.02 seconds, and measuring the load when pulling the probe away at a speed of 1 cm/s. A probe tack of 4 N or lower was considered to pass, and a higher probe tack was considered to fail.

<Adhesive Strength Between Adhesive Layers>

Two test pieces of width 15 mm×length 120 mm were prepared, the adhesive layers of the test pieces were bonded together over an area of 15 mm×100 mm, in a 23° C. environment, by having a compression bonding roller with a load of 2 kg, moving at a speed of 5 mm per second, perform one round trip, after which the test pieces were allowed to rest for 20 minutes. Next, the load when the two test pieces were peeled apart at a speed of 300 mm/minute in a 23° C. environment was measured. The peeling direction of the test pieces was set to be such that the angle between the two test pieces was 180° after being peeled apart. An adhesive strength between the adhesive layers of 5 N or higher was considered to pass, and a lower adhesive strength was considered to fail.

<Peelability>

The adhesive surfaces of the samples were visually observed after measuring the adhesive strength between the adhesive layers. If the adhesive surfaces were able to be peeled apart over the entirety of the interface and remained on the intermediate layers in the same state as before bonding, then a "○" was recorded. If the adhesive surfaces were able to be peeled apart over the entirety of the interface, but the adhesive surface was roughened and whitened, then a "Δ" was recorded. If some or all of the adhesive on one side was peeled away from the intermediate layer and the adhesive was transferred to the other side, then an "x" was recorded. In terms of the evaluation of the peelability, "○" and "Δ" were considered to pass, and "x" was considered to fail.

<Re-Adherability>

Of the samples that were evaluated for peelability, the adhesive strength between the adhesive surfaces was measured regarding those for which a "○" or a "Δ" was recorded. An adhesive strength of 5 N or higher was considered to pass, and a lower adhesive strength was considered to fail.

<Back-Surface Adhesive Strength>

Two test pieces of width 50 mm×length 120 mm were prepared, the adhesive layer of a test piece was bonded with the surface (back surface) on the back side of the adhesive surface over an area of 15 mm×100 mm, in a 23° C. environment, by having a compression bonding roller with a load of 2 kg, moving at a speed of 5 mm per second, perform one round trip, after which the test pieces were allowed to rest for 20 minutes. Next, the load when the two test pieces were peeled apart at a speed of 300 mm/minute in a 23° C. environment was measured. The peeling direction of the test pieces was set to be such that the angle between the two test pieces was 180° after being peeled apart. A back-surface adhesive strength of 0.1 N or lower was considered to pass, and a higher back-surface adhesive strength was considered to fail.

TABLE 1

| Compound Name | Product No. | Manufacturer |
| --- | --- | --- |
| Polyvinyl chloride | TH-1000 | Taiyo Vinyl |
| Diisononyl phthalate | DINP | New Japan Chemical |
| Trioctyl trimellitate | TOTM | DIC |
| Dioctyl adipate | DOA | J-Plus |
| Natural rubber emulsion | HA LATEX | Regitex |
| Acrylic rubber emulsion | Nikasol EH-2743 | Nippon Carbide |
| Acrylonitrile-butadiene rubber (NBR) emulsion | Nipol LX550L | Zeon |
| Methyl methacrylate-butadiene rubber (MBR) emulsion | Nalstar MR-170 | Nippon A&L |

TABLE 2

| | | | MG10 | MG30 | MG50 | MG60 |
| --- | --- | --- | --- | --- | --- | --- |
| Blended Amount | Methyl methacrylate monomer | kg | 0.10 | 0.30 | 0.50 | 0.60 |
| | Natural rubber emulsion | kg | 1.80 | 1.40 | 1.00 | 0.80 |
| | Benzoyl peroxide | kg | 0.07 | 0.07 | 0.07 | 0.07 |
| | Tetraethylene pentamine | kg | 0.07 | 0.07 | 0.07 | 0.07 |
| Composition | Methyl methacrylate | mass % | 5 | 15 | 25 | 30 |
| | Natural rubber | mass % | 45 | 35 | 25 | 20 |
| | Water | mass % | 50 | 50 | 50 | 50 |

TABLE 3

| | | | | | A-1 | A-2 | A-3 | A-4 | A-5 | A-6 | A-7 | A-8 | A-9 | A-10 |
| --- | --- | --- | --- | --- | --- | --- | --- | --- | --- | --- | --- | --- | --- | --- |
| Blended Amount | Rubber component (C) | Natural rubber (C1) | | g | 20 | 40 | 60 | 80 | 60 | 90 | 70 | | 40 | 20 |
| | | MMA-grafted natural rubber (C2) | MG10 | g | | | | | | | 30 | | | |
| | | | MG30 | g | 80 | 60 | 40 | 20 | | | | 100 | | |
| | | | MG50 | g | | | | | | | | | 60 | |
| | | | MG60 | g | | | | | 40 | 10 | | | | 80 |
| | | Depolymerized natural rubber (C3) | | g | | | | | | | | | | |

TABLE 3-continued

| Adhesive Layer | Rubber component (C) | Sulfur-crosslinked natural rubber (C4) | g | | | | | | | | | | |
|---|---|---|---|---|---|---|---|---|---|---|---|---|---|
| | Plasticizer (A) | DINP | g | 25 | 25 | 25 | 25 | 25 | 25 | 25 | 25 | 25 | 25 |
| | | TOTM | g | | | | | | | | | | |
| | | DOA | g | | | | | | | | | | |
| | Rubber component composition | Methyl methacrylate | mass % | 24 | 18 | 12 | 6 | 24 | 6 | 3 | 30 | 30 | 48 |
| | | Natural rubber | mass % | 76 | 82 | 88 | 94 | 76 | 94 | 97 | 70 | 70 | 52 |
| | Gel fraction | | mass % | 56 | 62 | 68 | 74 | 65 | 74 | 77 | 50 | 50 | 32 |

| | | | | A-11 | A-12 | A-13 | A-14 | A-15 | A-16 | A-17 | A-18 | A-19 |
|---|---|---|---|---|---|---|---|---|---|---|---|---|
| Blended Amount | Rubber component (C) | Natural rubber (C1) | g | | 100 | | | 60 | 60 | 60 | 60 | 60 | 40 |
| | | MMA-grafted natural rubber (C2) MG10 | g | | | | | | | | | | |
| | | MG30 | g | | | 40 | 40 | 40 | 40 | 40 | 40 | 40 | |
| | | MG50 | g | | | | | | | | | | 60 |
| | | MG60 | g | | | | | | | | | | |
| | | Depolymerized natural rubber (C3) | g | | | | 60 | | | | | | |
| | | Sulfur-crosslinked natural rubber (C4) | g | | | | | 60 | | | | | |
| | Plasticizer (A) | DINP | g | | 25 | 25 | 25 | 13 | 45 | 67 | | | |
| | | TOTM | g | | | | | | | | 25 | | |
| | | DOA | g | | | | | | | | | 25 | |
| Adhesive Layer | Rubber component composition | Methyl methacrylate | mass % | 0 | 12 | 12 | 12 | 12 | 12 | 12 | 12 | 30 |
| | | Natural rubber | mass % | 100 | 88 | 88 | 88 | 88 | 68 | 88 | 88 | 70 |
| | Gel fraction | | mass % | 80 | 24 | 86 | 68 | 68 | 86 | 68 | 68 | 50 |

TABLE 4

| | | | | Ex. 1 | Ex. 2 | Ex. 3 | Ex. 4 | Ex. 5 | Ex. 6 |
|---|---|---|---|---|---|---|---|---|---|
| Substrate | Polyvinyl chloride | | parts by mass | 100 | 100 | 100 | 100 | 100 | 100 |
| | Plasticizer (A) | | name | DINP | DINP | DINP | DINP | DINP | DINP |
| | | | parts by mass | 40 | 40 | 40 | 40 | 40 | 40 |
| Intermediate Layer (Primer Layer) | MMA-grafted natural rubber (B) | | name | MG50 | MG50 | MG50 | MG50 | MG50 | MG50 |
| | | | parts by mass | 100 | 100 | 100 | 100 | 100 | 100 |
| Adhesive Layer | name | | | A-1 | A-2 | A-3 | A-4 | A-5 | A-B |
| | Rubber component (C) | Methyl methacrylate | mass % | 24 | 18 | 12 | 6 | 24 | 6 |
| | | Natural rubber | mass % | 76 | 82 | 88 | 94 | 76 | 94 |
| | Gel fraction | | mass % | 56 | 62 | 68 | 74 | 65 | 74 |
| | Degree of swelling | | factor | 2.5 | 2.3 | 2.2 | 2.1 | 2.7 | 2.2 |
| | Plasticizer content in adhesive layer | | mass % | 21 | 23 | 25 | 27 | 18 | 20 |
| Physical Properties | Probe tack | | N/cm² | 2.1 | 2.5 | 2.7 | 2.9 | 2.2 | 3.1 |
| | Adhesive strength between adhesive layers | | N | 7.5 | 8.1 | 12.6 | 10.5 | 7.1 | 11.1 |
| | Peelability | | | ○ | ○ | ○ | ○ | ○ | ○ |
| | Re-adherability | | N | 6.3 | 6.9 | 10.1 | 8.5 | 6.6 | 8.9 |
| | Back-surface adhesive strength | | N | 0.07 | 0.05 | 0.03 | 0.01 | 0.01 | 0.61 |

| | | | | Ex. 7 | Ex. 8 | Ex. 9 | Ex. 10 | Ex. 11 |
|---|---|---|---|---|---|---|---|---|
| Substrate | Polyvinyl chloride | | parts by mass | 100 | 100 | 100 | 100 | 100 |
| | Plasticizer (A) | | name | DINP | DINP | DINP | DINP | DINP |
| | | | parts by mass | 40 | 40 | 40 | 40 | 40 |
| Intermediate Layer (Primer Layer) | MMA-grafted natural rubber (B) | | name | MG50 | MG50 | MG30 | MG10 | MG60 |
| | | | parts by mass | 100 | 100 | 100 | 100 | 100 |
| Adhesive Layer | name | | | A-7 | A-9 | A-3 | A-3 | A-3 |
| | Rubber component (C) | Methyl methacrylate | mass % | 3 | 30 | 12 | 12 | 12 |
| | | Natural rubber | mass % | 97 | 70 | 88 | 88 | 88 |
| | Gel fraction | | mass % | 77 | 50 | 70 | 69 | 71 |

TABLE 4-continued

|  |  |  |  |  |  |  |  |
|---|---|---|---|---|---|---|---|
|  | Degree of swelling | factor | 1.7 | 3.3 | 2.1 | 2.2 | 2 |
|  | Plasticizer content in adhesive layer | mass % | 20 | 20 | 20 | 20 | 20 |
| Physical Properties | Probe tack | N/cm$^2$ | 3.7 | 1.8 | 2.7 | 2.6 | 2.6 |
|  | Adhesive strength between adhesive layers | N | 10.4 | 7.1 | 10.3 | 8.3 | 13.2 |
|  | Peelability |  | Δ | ◯ | ◯ | ◯ | ◯ |
|  | Re-adherability | N | 6.4 | 5.4 | 7.8 | 6.4 | 12.2 |
|  | Back-surface adhesive strength | N | 0.01 | 0.08 | 0.03 | 0.03 | 0.03 |

TABLE 5

|  |  |  |  | Ex. 12 | Ex. 13 | Ex. 14 | Ex. 15 | Ex. 16 | Ex. 17 | Ex. 18 | Ex. 19 |
|---|---|---|---|---|---|---|---|---|---|---|---|
| Substrate | Polyvinyl chloride |  | parts by mass | 100 | 100 | 100 | 100 | 100 | 100 | 100 | 100 |
|  | Plasticizer (A) |  | name | DINP | DINP | DINP | TOTM | DOA | DINP | DINP | DINP |
|  |  |  | parts by mass | 40 | 40 | 40 | 40 | 40 | 40 | 40 | 40 |
| Intermediate Layer (Primer Layer) | MMA-grafted natural rubber (B) |  | name | MG50 | MG50 | MG50 | MG50 | MG50 | MG50 | MG50 | MG50 |
|  |  |  | parts by mass | 100 | 100 | 100 | 100 | 100 | 100 | 100 | 100 |
|  | Synthetic rubber |  | name |  |  |  |  |  | acrylic rubber | NBR | MBR |
|  |  |  | parts by mass |  |  |  |  |  | 50 | 50 | 50 |
| Adhesive Layer | name |  |  | A-14 | A-15 | A-16 | A-17 | A-18 | A-3 | A-3 | A-3 |
|  | Rubber component (C) | Methyl methacrylate | mass % | 12 | 12 | 12 | 12 | 12 | 12 | 12 | 12 |
|  |  | Natural rubber | mass % | 88 | 88 | 88 | 88 | 88 | 88 | 88 | 88 |
|  | Gel fraction |  | mass % | 68 | 68 | 68 | 71 | 71 | 71 | 71 | 71 |
|  | Degree of swelling |  | factor | 2.1 | 2.1 | 2.2 | 1.7 | 3.4 | 1.7 | 1.7 | 3.4 |
|  | Plasticizer content in adhesive layer |  | mass % | 10 | 30 | 40 | 20 | 20 | 20 | 20 | 20 |
| Physical Properties | Probe tack |  | N/cm$^2$ | 2.1 | 2.9 | 3.8 | 1.8 | 3.5 | 2.4 | 2.5 | 2.6 |
|  | Adhesive strength between adhesive layers |  | N | 8.3 | 11.3 | 10.1 | 9.7 | 16.5 | 12.1 | 12.4 | 12.3 |
|  | Peelability |  |  | ◯ | ◯ | Δ | ◯ | Δ | ◯ | ◯ | ◯ |
|  | Re-adherability |  | N | 6.7 | 9.1 | 8.1 | 7.3 | 10.1 | 10.6 | 12.0 | 11.8 |
|  | Back-surface adhesive strength |  | N | 0.02 | 0.05 | 0.07 | 0.03 | 0.03 | 0.05 | 0.05 | 0.05 |

TABLE 6

|  |  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|---|---|
| Substrate | Polyvinyl chloride |  | parts by mass | 100 | 100 | 100 | 100 | 100 | 100 | 100 | 100 | 100 | 100 |
|  | Plasticizer (A) |  | name | DINP | DINP | DINP | DINP | DINP | DINP | DINP | DINP | DINP | — |
|  |  |  | parts by mass | 40 | 40 | 40 | 40 | 40 | 40 | 40 | 40 | 40 | 0 |
| Intermediate Layer (Primer Layer) | MMA-grafted natural rubber (B) |  | name | MG50 | MG50 | MG50 | MG50 | MG50 | MG50 | natural rubber | NBR | none | MG50 |
|  |  |  | parts by mass | 100 | 100 | 100 | 100 | 100 | 100 | 100 | 100 |  | 100 |
| Adhesive Layer | name |  |  | A-8 | A-10 | A-11 | A-12 | A-13 | A-19 | A-3 | A-3 | A-3 | A-19 |
|  | Rubber component (C) | Methyl methacrylate | mass % | 30 | 48 | 0 | 12 | 12 | 30 | 12 | 12 | 12 | 30 |
|  |  | Natural rubber | mass % | 70 | 52 | 100 | 88 | 88 | 70 | 88 | 88 | 88 | 70 |
|  | Gel fraction |  | mass % | 50 | 32 | 80 | 24 | 86 | 50 | 70 | 70 | 70 | 50 |
|  | Degree of swelling |  | factor | 2.7 | 5.7 | 1.7 | 6.1 | 1.4 | 3.3 | 2.1 | 2.1 | 2.1 | 3 |
|  | Plasticizer content in adhesive layer |  | mass % | 20 | 20 | 20 | 20 | 20 | 0 | 20 | 20 | 20 | 0 |
| Physical Properties | Probe tack |  | N/cm$^2$ | 1.9 | 2.5 | 4.2 | 4.8 | 1.8 | 1.2 | 2.8 | 2.7 | 2.6 | 1.2 |
|  | Adhesive strength between adhesive layers |  | N | 4.7 | 6.3 | 3.8 | 12.1 | 4.6 | 3.8 | 1.8 | 5.2 | 0.7 | 3.8 |

TABLE 6-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Peelability |  | ○ | ○ | X | Δ | ○ | ○ | X | X | X | ○ |
| Re-adherability | N | 4.3 | 5.5 | n/a | 6.8 | 3.6 | 2.9 | n/a | n/a | n/a | 2.6 |
| Back-surface adhesive strength | N | 0.12 | 0.25 | 0.00 | 0.04 | 0.00 | 0.02 | 0.03 | 0.03 | 0.03 | 0.02 |

The invention claimed is:

1. An adhesive sheet in which an intermediate layer containing methyl methacrylate-grafted natural rubber (B) is provided on a substrate containing a vinyl chloride resin and a plasticizer (A), and an adhesive layer comprising an adhesive containing the plasticizer (A) and a rubber component (C) containing natural rubber (C1) and methyl methacrylate-grafted natural rubber (C2) is provided on the intermediate layer, wherein a degree of swelling of the rubber component (C) with respect to the plasticizer (A) is by a factor of 1.5 to 4.5.

2. The adhesive sheet according to claim 1, wherein a plasticizer (A) content in 100 mass % of the adhesive is 5 to 35 mass %.

3. The adhesive sheet according to claim 1, wherein the methyl methacrylate/natural rubber ratio of the rubber component (C) is 3/97 to 30/70 mass %.

4. The adhesive sheet according to claim 1, further containing, in the intermediate layer, 100 parts by mass or less of a synthetic rubber relative to 100 parts by mass of the methyl methacrylate-grafted natural rubber (B) contained in the intermediate layer.

5. The adhesive sheet according to claim 1, wherein the gel fraction in the rubber component (C) is 50 to 100 mass %.

6. The adhesive sheet according to claim 1, wherein the plasticizer (A) contained in the substrate and the adhesive layer is diisononyl phthalate (DINP).

7. The adhesive sheet according to claim 1, for binding and protecting an electric cable.

* * * * *